US011719322B2

(12) United States Patent
Todderud et al.

(10) Patent No.: US 11,719,322 B2
(45) Date of Patent: Aug. 8, 2023

(54) MULTI-SEGMENT SPROCKET FOR A REEL DRIVE MECHANISM OF A HEADER OF AN AGRICULTURAL HARVESTER

(71) Applicant: CNH Industrial America LLC, New Holland, PA (US)

(72) Inventors: Stephen Todderud, Lancaster, PA (US); Kevin Ward, Lititz, PA (US)

(73) Assignee: CNH Industrial America, LLC, New Holland, PA (US)

( * ) Notice: Subject to any disclaimer, the term of this patent is extended or adjusted under 35 U.S.C. 154(b) by 755 days.

(21) Appl. No.: 16/688,280

(22) Filed: Nov. 19, 2019

(65) Prior Publication Data

US 2021/0148446 A1    May 20, 2021

(51) Int. Cl.
*F16H 55/12* (2006.01)
*A01D 57/12* (2006.01)
(Continued)

(52) U.S. Cl.
CPC .............. *F16H 55/12* (2013.01); *A01D 57/12* (2013.01); *F16H 55/30* (2013.01); *A01D 34/04* (2013.01); *F16H 55/17* (2013.01)

(58) Field of Classification Search
CPC .......... F16H 55/00; F16H 55/12; F16H 55/17; F16H 55/30; F16H 55/303;
(Continued)

(56) References Cited

U.S. PATENT DOCUMENTS 2,230,902 A * 2/1941 Overbey ................. F16H 55/12
74/448
2,429,008 A * 10/1947 Wolfe ..................... F16H 55/12
74/450
(Continued)

FOREIGN PATENT DOCUMENTS

CN         103821907 A  * 5/2014   ............. F16H 55/12
WO    WO-2019179588 A1 * 9/2019   ............. B65G 23/04

OTHER PUBLICATIONS

Extended European Search Report for EP Application No. 20208504.9 dated Jun. 21, 2021 (seven pages).

*Primary Examiner* — Michael R Mansen
*Assistant Examiner* — Raveen J Dias
(74) *Attorney, Agent, or Firm* — Peter K. Zacharias

(57) ABSTRACT

A multi-segment sprocket assembly including a sprocket hub and a multi-segment sprocket. The multi-segment sprocket includes a first partial annular sprocket having a first end that includes a first flange, a second partial annular sprocket having a second end that includes a second flange, and at least a first fastener for releasably securing the first and second partial annular sprockets to the sprocket hub. Also disclosed is a harvester reel including a reel drive mechanism that includes a shaft, and the aforementioned multi-segment sprocket attached to the shaft. Also disclosed is a method for changing speeds of a drive mechanism of for a header of and agricultural harvester. The method includes removing the aforementioned multi-segment sprocket having a first overall diameter from a shaft of the header, and (Continued)

replacing the removed multi-segment sprocket with an aforementioned multi-segment sprocket having a second overall diameter that differs from the first overall diameter.

12 Claims, 3 Drawing Sheets

(51) Int. Cl.
 *F16H 55/30* (2006.01)
 *A01D 34/04* (2006.01)
 *F16H 55/17* (2006.01)
(58) Field of Classification Search
 CPC ... F16H 2055/306; F16H 55/46; A01D 34/04; A01D 41/14; A01D 41/1274; A01D 57/02; A01D 57/03; A01D 57/12; A01D 61/00; A01D 61/04; A01D 61/002; A01D 61/008; A01D 69/06; B62M 9/10; B62M 9/105; B65G 23/00; B65G 23/02; B65G 23/04; B65G 23/06
 See application file for complete search history.

(56) References Cited

U.S. PATENT DOCUMENTS

| | | | |
|---|---|---|---|
| 3,083,585 A | 4/1963 | Dawe et al. | |
| 3,472,090 A * | 10/1969 | Dawe | B62D 55/135 74/447 |
| 3,742,779 A * | 7/1973 | Shaver | F16H 55/12 241/176 |
| 4,043,214 A | 8/1977 | Westlake | |
| 4,058,023 A * | 11/1977 | Smith | F16H 55/12 474/902 |
| 4,127,038 A * | 11/1978 | Browning | B62M 9/12 280/236 |
| 4,472,164 A * | 9/1984 | Pusch | F16H 55/30 74/DIG. 10 |
| 4,964,842 A * | 10/1990 | Howard | F16H 55/171 474/96 |
| 5,000,640 A * | 3/1991 | Haas, Jr. | F16H 55/12 411/432 |
| 5,277,087 A * | 1/1994 | Wilson, Jr. | B25B 13/48 81/57.29 |
| 5,279,526 A | 1/1994 | Gundlach | |
| 5,295,917 A * | 3/1994 | Hannum | F16H 55/46 474/95 |
| 5,316,522 A * | 5/1994 | Carbone | F16H 55/12 474/903 |
| 5,346,429 A * | 9/1994 | Farley | B65G 23/04 474/140 |
| 5,389,044 A * | 2/1995 | Bandy, Jr. | F16H 55/12 474/96 |
| 5,469,958 A * | 11/1995 | Gruettner | B65G 23/06 474/903 |
| 5,569,106 A * | 10/1996 | Splittstoesser | A01D 34/69 474/135 |
| 5,833,562 A * | 11/1998 | Walker, Sr. | F16H 55/46 474/902 |
| 6,074,316 A | 6/2000 | Murrietta, Sr. | |
| 6,086,495 A * | 7/2000 | Stebnicki | F16H 55/46 474/96 |
| 6,125,713 A * | 10/2000 | Langlois | B23P 6/00 74/450 |
| 6,758,776 B2 * | 7/2004 | Fye | F16H 55/30 474/95 |
| 8,151,547 B2 | 4/2012 | Bich et al. | |
| 8,267,818 B2 | 9/2012 | Curley et al. | |
| 10,113,632 B2 * | 10/2018 | Lo | F16H 55/12 |
| 10,238,035 B2 | 3/2019 | Walters et al. | |
| 2004/0147348 A1 * | 7/2004 | Yiu | F16H 55/30 474/96 |
| 2005/0075206 A1 * | 4/2005 | Kabrich | B62D 55/12 474/162 |
| 2007/0161443 A1 * | 7/2007 | Krisl | F16H 55/30 474/95 |
| 2007/0204583 A1 * | 9/2007 | Goers | A01D 61/002 56/14.4 |
| 2010/0160097 A1 * | 6/2010 | Van Der Ende | F16H 55/30 474/95 |
| 2010/0331128 A1 * | 12/2010 | Johnson | A01C 19/04 474/158 |
| 2017/0055448 A1 * | 3/2017 | Missotten | A01D 57/22 |
| 2017/0127615 A1 * | 5/2017 | Crow | A01D 57/22 |
| 2017/0167590 A1 * | 6/2017 | Braedt | B62M 9/12 |
| 2017/0251603 A1 | 9/2017 | Walters et al. | |
| 2017/0251606 A1 * | 9/2017 | Van Overschelde | A01D 61/02 |
| 2018/0164451 A1 * | 6/2018 | Lyssy | F16H 1/26 |
| 2018/0305133 A1 * | 10/2018 | Brown, Sr. | B65G 39/02 |
| 2019/0082599 A1 * | 3/2019 | Cook | A01D 41/16 |
| 2020/0056691 A1 * | 2/2020 | Bosmann | F16H 55/303 |
| 2021/0231208 A1 * | 7/2021 | Boriack | A01D 61/008 |

* cited by examiner

MULTI-SEGMENT SPROCKET FOR A REEL DRIVE MECHANISM OF A HEADER OF AN AGRICULTURAL HARVESTER

The exemplary embodiments of the subject disclosure relate generally to a header of a plant cutting machine (e.g., a combine harvester) and, more specifically, to a header having quickly disassembleable and reassembleable multi-segment sprockets for a reel drive mechanism of the header.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing the plants or crops via, for example, an elongate sickle mechanism that reciprocates sidewardly relative to a non-reciprocating guard structure and oftentimes one or more reels for gathering the cut crop. After crops are cut, they are collected inside the header and transported via a conveyor such as a draper belt towards a feederhouse located centrally inside the header.

Currently, when it is desired to change the reel speed of the reel(s) of an agricultural harvester header it is necessary to remove or break down significant portions of the machine. Current reel drive mechanisms require axial installation of driven sprockets. Such a method is acceptable for drives that are mounted to the end of the reel. However, with multi-segment headers it can be disadvantageous to mount the reel drive between segments. With traditional drive mechanisms, the reel would need to be disassembled in order to change or install different drive sprockets since they are axially mounted on the reel. Such disassembly and reassembly of reels and installation of appropriate drive sprockets is time consuming and results in substantial equipment downtime that reduces the harvesting efficiency of the header.

SUMMARY OF THE DISCLOSURE

In accordance with a first exemplary embodiment there is provided a multi-segment sprocket for a reel drive mechanism of a header of an agricultural harvester. The multi-segment sprocket comprises a first partial annular sprocket having a first end that includes a first flange, and a second partial annular sprocket having a second end that includes a second flange. A first fastener is formed by the first flange and second flange.

In accordance with another exemplary embodiment, there is provided a multi-segment sprocket assembly comprising a sprocket hub, the multi-segment sprocket of the first exemplary embodiment, and a plurality of fasteners for releasably securing the first and second partial annular sprockets to the sprocket hub.

In accordance with another exemplary embodiment, there is provided a harvester reel comprising a reel drive mechanism. The reel drive mechanism includes a shaft, and the multi-segment sprocket of the first exemplary embodiment attached to the shaft.

In accordance with another exemplary embodiment, there is provided a method for changing speeds of a drive mechanism for a header of an agricultural harvester comprising removing the multi-segment sprocket of the first exemplary embodiment having a first overall diameter from a shaft of the header. The method further comprises replacing the removed multi-segment sprocket with a multi-segment sprocket of the first exemplary embodiment having a second overall diameter that differs from the first overall diameter.

In accordance with the exemplary embodiments, there are provided multi-segment sprockets of different overall diameters that can be rapidly disassembled and assembled on a shaft of a header for an agricultural harvester. Such multi-segment sprockets can be quickly removed and installed between the reels of a multi-segment header, thereby avoiding disassembly of the reels which is currently required when installing axially mounted sprockets on the header shaft. Consequently, the subject disclosure provides an arrangement whereby equipment downtime is substantially reduced and the harvesting efficiency of the header is corresponding increased.

Other features and advantages of the subject disclosure will be apparent from the following more detail description of the exemplary embodiments.

BRIEF DESCRIPTION OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DRAWINGS

Figure 1:
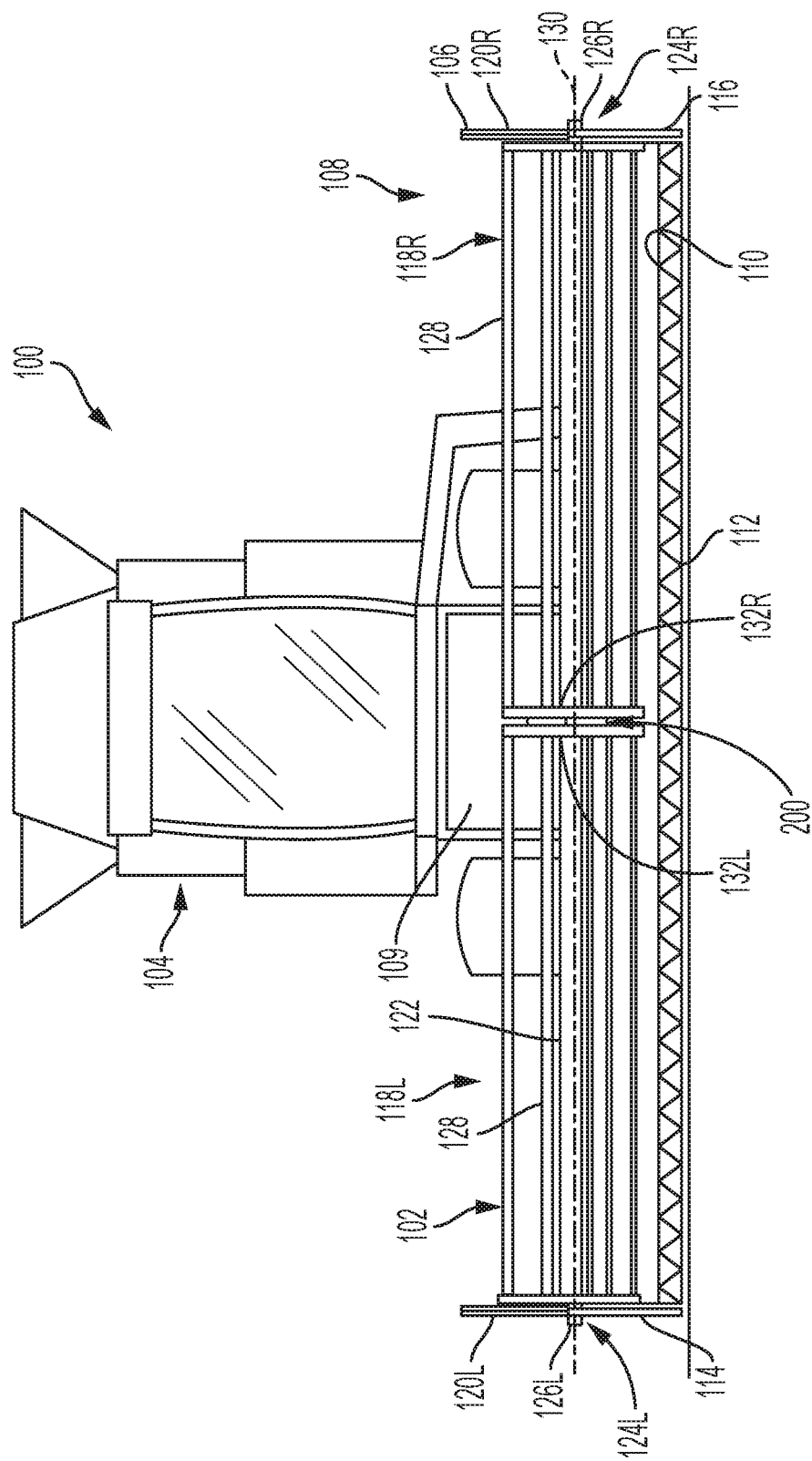
FIG. 1 is a front elevation view of an agricultural harvester including a header with a multi-segment sprocket assembly in accordance with an exemplary embodiment of the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Additionally, for convenience purposes only, identical or substantially similar elements of the subject disclosure, such as a plurality of reels 118R and 118L may be described with reference to only one of those elements, such as the reel 118R. It is appreciated therefore that the description of one element is equally applicable to the remainder of the same elements. As such, identical elements, or substantially identical elements where so indicated, will be identified, where appropriate, by the same reference numeral, e.g., 118, and distinguished by an alphabetical letter, e.g., R, L, etc. For example, the reel 118R is one of the reels and the reel 118L is another of the reels.

Referring now to the drawings wherein aspects of the subject disclosure are shown, FIG. 1 illustrates an agricultural harvester 100 in accordance with an exemplary embodiment. For exemplary purposes only, the agricultural harvester is illustrated as a combine harvester. The harvester 100 comprises a header 102 and a cab 104 for an operator of the harvester. The header 102 includes a frame 106, and a segmented harvesting reel assembly 108.

The frame 106 is the structural chassis of the header 102 and allows for the various components of the header 102 to be attached thereto. The header 102 is attached to a forward end of the harvester 100, and is configured to cut crops, including (without limitation) small grains (e.g., wheat, soybeans, grain, etc.), and to induct the cut crops into a feederhouse 109 as the harvester 100 moves forward over a crop field.

The header 102 includes a floor 110 that is supported in desired proximity to a surface of a crop field and a cutter bar 112. The cutter bar 112 of the header 102 extends transversely along a forward edge of the floor 110 i.e., in a widthwise direction of the harvester 100, and is bound by a first side edge 114 and an opposing second side edge 116, which are both adjacent to the floor 110. The cutter bar 112 is configured to cut crops in preparation for induction into the feederhouse 109. It is appreciated that the cutter bar 112 includes one or more reciprocating sickles such as those disclosed in U.S. Pat. No. 8,151,547, the entire disclosure of which is incorporated herein by reference for all purposes.

The elongated and rotatable harvesting reel assembly 108 extends above and in close proximity to the cutter bar 112. In the illustrated example, the harvesting reel assembly 108 is segmented and typically configured to cooperate with a plurality of draper belts, such as lateral draper belts and infeed draper belts (not illustrated), for conveying cut crops to the feederhouse 109, for threshing and cleaning. The header 102 may include a rotatable auger, i.e. a conveyor screw (not illustrated), to facilitate feeding into the feederhouse 109. While the foregoing aspects of the harvester 100 are being described with respect to the header 102 shown, the harvesting reel assembly 108 of the subject disclosure can be applied to any other header having use for such a reel assembly. It is understood that, unless otherwise specified, the right side of the harvesting reel assembly 108 is substantially structurally similar to the left side.

The harvesting reel assembly 108 comprises at least a pair of harvesting reels or, simply, first and second reels 118L, 118R which include at least a pair of spaced apart outer reel spiders 120L, 120R engaged on a rotatable shaft or axle 122 supported at its outer ends 124L, 124R by outboard supports 126L, 126R for rotation about a reel axis 130. The spiders 120L, 120R in turn support a plurality of pivotally moveable tine bars 128 (the tines of which are not illustrated) which orbit about reel axis 130 as the spiders rotate about the reel axis. Additional spiders, e.g., inner reel spiders 132L, 132R may be intermediately positioned between the outboard spiders for additional tine bar support in wider reels. A multi-segment sprocket assembly 200 in accordance with the subject disclosure is secured to shaft 122 between the first and second reels 118L, 118R.

Figure 2:
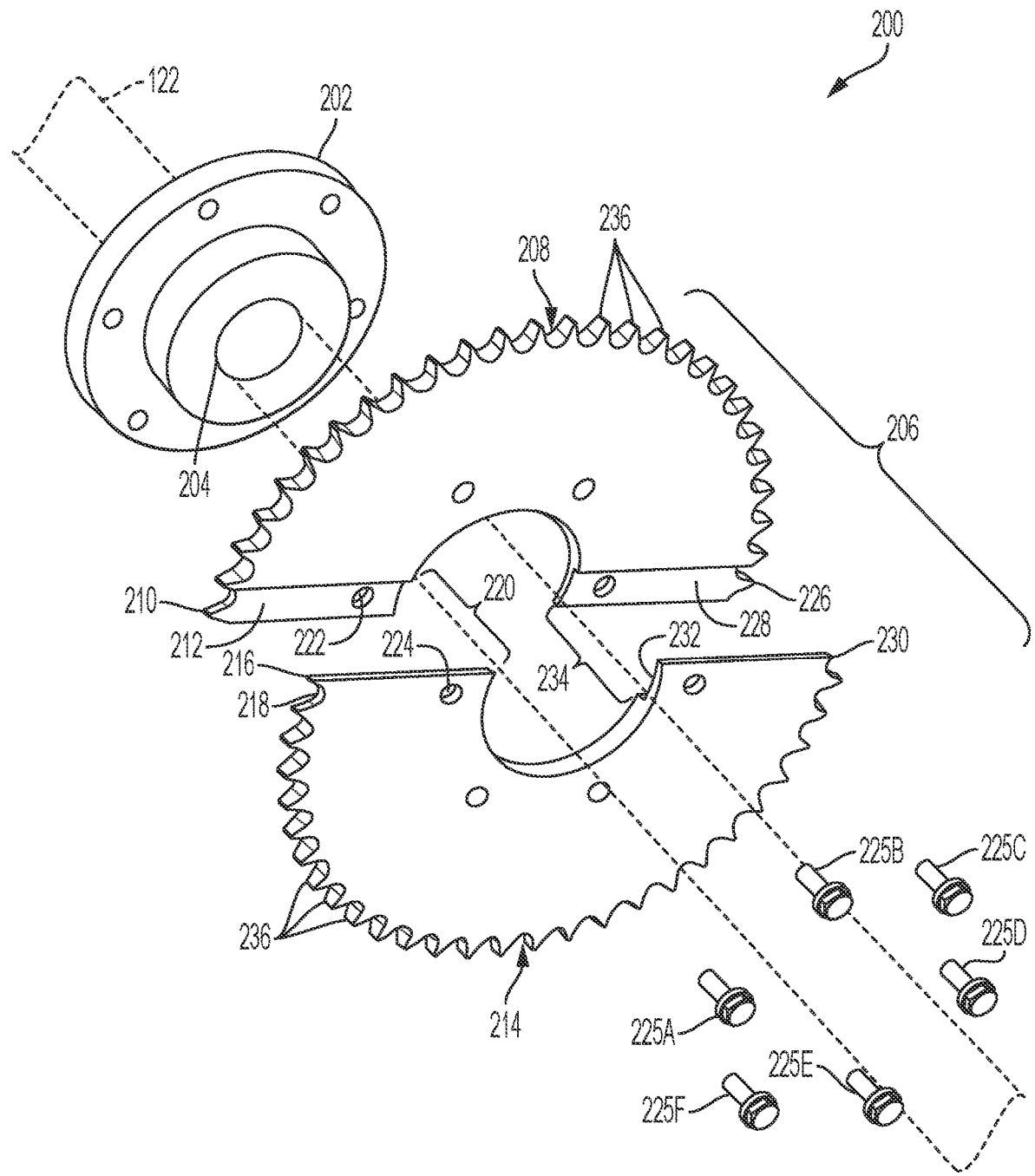
FIG. 2 is an exploded perspective view of a multi-segment sprocket assembly in accordance with the subject disclosure suitable for use with the header of FIG. 1.

As shown in FIG. 2, a multi-segment sprocket assembly 200 is mountable to the reel shaft 122 (shown in dashed line in FIG. 2). The multi-segment sprocket assembly 200 comprises a sprocket hub 202 which is fixedly secured to the reel shaft 122. The sprocket hub may be affixed to the reel shaft by any suitable method, such as welding or keying. However, a preferred method involves heating the sprocket hub whereby the entirety of the hub including its central opening 204 expands. The sprocket hub is then slid onto the reel shaft to the desired location and allowed to cool, whereby it becomes firmly shrink-fitted onto the reel shaft.

In accordance with an exemplary embodiment, the multi-segment sprocket assembly includes a multi-segment sprocket 206 that comprises a first partial annular sprocket 208 having a first end 210 that includes a first flange 212. The multi-segment sprocket 206 further comprises a second partial annular sprocket 214 having a second end 216 that includes a second flange 218.

A first fastener 220 is formed by the first flange 212 and the second flange 218. The first fastener 220 comprises a first through hole 222 extending through the first flange 212 and a second through hole 224 extending through the second flange 218. According to an aspect, the first fastener further comprises a bolt 225A extending through the first and second through holes.

In accordance with an exemplary embodiment, the first flange 212 is a first half lap and the second flange 218 is a second half lap configured to form a joint with the first half lap. In addition, the first flange 212 extends from an inner radial surface of the first partial annular sprocket 208 to an outer radial surface of the first partial annular sprocket. Moreover, the first partial annular sprocket 208 includes a primary end 226 having a primary flange 228. Further, the second partial annular sprocket 214 further includes a secondary end 230 having a secondary flange 232. A second fastener 234 is formed by the primary flange and secondary flange.

According to an aspect, the first flange 212 and the primary flange 228 are spaced apart by about 180 degrees, and the first partial annular sprocket 208 extends a revolution of about 180 degrees. Alternatively, the first and primary flanges can be spread apart by about 30, 40, 50, 60, 70, 80, 90, 100, 110, 120, 130, 140, 150, 160, 170, 190, 200 210 and 220 degrees. In the illustrated example, the first partial annular sprocket 208 is depicted substantially semi-circular. It is understood that the first and second partial annular sprockets may span revolutions less than 180 degrees, in which case additional partial annular sprockets can be provided to complete the sprocket circle. By way of example, but not limitation, the first partial annular sprocket can extend a revolution of about 30, 40, 50, 60, 70, 80, 90, 100, 110, 120, 130, 140, 150, 160, 170, 180, 190, 200, 210 and 220 degrees.

Figure 3:
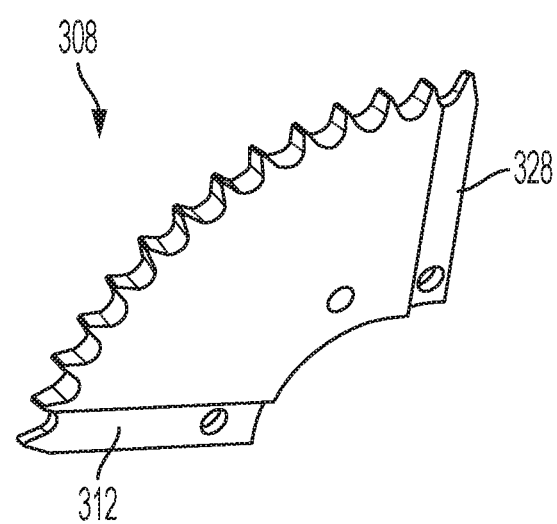
FIG. 3 is a perspective view of a first partial annular sprocket of another multi-segment sprocket assembly in accordance with the subject disclosure suitable for use with the header of FIG. 1

As shown, for example, in FIG. 3, the first flange 312 and the primary flange 328 of the first partial annular sprocket 308 are spread apart by about 90 degrees and the first partial annular sprocket 308 extends a revolution of about 90 degrees. It is understood that the first partial annular sprocket can be joined with an unillustrated second partial annular sprocket extending, e.g., a revolution of about 90 degrees. Together, such first and second partial annular sprockets can be joined with unillustrated third and fourth partial annular sprockets each extending a revolution of about 90 degrees, or with a third partial annular sprocket extending a revolution of about 180 degrees, to form a complete multi-segment sprocket.

Referring again to FIG. 2, the multi-segment sprocket assembly 200 further comprises, in addition to the sprocket hub 202 and the above-described multi-segment sprocket 206, a plurality of fasteners, e.g., bolts 225A, 225B, 225C, 225D, 225E and 225F, for releasably securing the first and second partial annular sprockets 208, 214 to the sprocket hub 202.

The subject disclosure further provides a harvester reel, e.g., reel 118L or reel 118R, comprising a reel drive mechanism that includes the shaft 122 and the above-described multi-segment sprocket 206 attached to the shaft. In this regard, the first and second partial annular sprockets 208, 214 are each provided with radially projecting teeth 236 that are adapted to engage with, e.g., an unillustrated endless chain. The chain, in turn, engages with an unillustrated drive mechanism such as a sprocket driven by a hydraulic, electric or mechanical motor carried by either the harvester 100 or the header 102. It is understood that operation of the motor moves the chain and thus rotates the multi-segment sprocket 206 and shaft 122 to rotate one or both of the reels 118L and 118R to gather cut crop for further conveyance within the header 102 and further processing by the harvester 100.

The subject disclosure further provides a method for changing speeds of a drive mechanism for a header of an agricultural harvester. Generally, the method comprises the step of removing the multi-segment sprocket having a first overall diameter from the shaft 122 of the header followed by the step of replacing the removed multi-segment sprocket with a multi-segment sprocket having a second overall diameter that differs from the first overall diameter. In accordance with the subject disclosure, the step of removing the multi-segment sprocket having the first overall diameter from the shaft 122 of the header is performed without removing other major components from the axis 130, e.g., the reel arm bracket/support, the reel coupler components, the hydraulic cylinders for reel activation, and the hydraulic or other motor for driving the reel. In addition, the present multi-segment sprocket system does not require a crane/overhead lift to support certain components during assembly and disassembly of the sprockets.

In particular, the fasteners, e.g., 225A, 225B, 225C, 225D, 225E and 225F are removed from corresponding threaded bores provided in the sprocket hub 202, whereby the first and second partial annular sprockets may be removed from the sprocket hub. Once the first and second partial annular sprockets of the multi-segment sprocket having the first overall diameter are removed from the shaft 122, first and second partial annular sprockets of a multi-segment sprocket having the second overall diameter different from the first overall diameter may be assembled to the shaft 122 in reverse order. That is, the first and second partial annular sprockets of a multi-segment sprocket having the second overall diameter are arranged such that their flanges come into mating contact whereby fasteners can be passed through holes in the first and second partial annular sprockets and threaded into the threaded bores provided in the sprocket hub 202. Accordingly, and unlike traditional sprocket driven reels, there is no need to remove or dismantle, e.g., either reel 118L or 118R, axially remove a gear on the reel shaft 122 and replace it with a gear having a different outer diameter, and reassemble or replace the reel 118L or 118R in order to change speeds of the reel drive mechanism.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

We claim:

1. A multi-segment sprocket comprising:
a first partial annular sprocket having a plurality of first teeth about a periphery thereof and a first end that includes a first flange;
a second partial annular sprocket having a plurality of second teeth about a periphery thereof and a second end that includes a second flange; and
a first fastener formed by the first flange and second flange,
wherein the first flange is a first half lap and the second flange is a second half lap configured to form a joint with the first half lap,
wherein the first half lap includes a portion of at least one of the first teeth and the second half lap includes a portion of at least one of the second teeth, and
wherein the portion of the at least one of the first teeth and the portion of the at least one of the second teeth form at least one complete tooth when the joint is formed.

2. The multi-segment sprocket of claim 1, wherein the first flange extends from an inner radial surface of the first partial annular sprocket to an outer radial surface of the first partial annular sprocket.

3. The multi-segment sprocket of claim 1, wherein the first partial annular sprocket further includes a primary end having a primary flange, wherein the second partial annular sprocket further includes a secondary end having a secondary flange, and further comprising a second fastener formed by the primary flange and secondary flange.

4. The multi-segment sprocket of claim 3, wherein the first flange and the primary flange are spaced apart by about 180 degrees.

5. The multi-segment sprocket of claim 1, wherein the first fastener comprises a first through hole extending through the first flange and a second through hole extending through the second flange.

6. The multi-segment sprocket of claim 5, wherein the first fastener further comprises a bolt for extending through the first and second through holes.

7. The multi-segment sprocket of claim 1, wherein the first partial annular sprocket extends a revolution of about 180 degrees.

8. The multi-segment sprocket of claim 1, wherein the first partial annular sprocket extends a revolution of about 90 degrees.

9. A multi-segment sprocket assembly comprising:
a sprocket hub;
the multi-segment sprocket of claim 1; and
a plurality of fasteners for releasably securing the first and second partial annular sprockets to the sprocket hub.

10. A harvester reel comprising:
a reel drive mechanism that includes:
    a shaft,
    the multi-segment sprocket of claim 1 attached to the shaft.

11. A method for changing speeds of a drive mechanism for a header of an agricultural harvester comprising:
removing the multi-segment sprocket of claim 1 having a first overall diameter from a shaft of the header; and
replacing the removed multi-segment sprocket with a multi-segment sprocket of claim 1 having a second overall diameter that differs from the first overall diameter.

12. The method of claim 11, further comprising removing the multi-segment sprocket of claim 1 having the first overall diameter from the shaft of the header without removing other major components from an axis.

* * * * *